United States Patent Office 2,917,544
Patented Dec. 15, 1959

2,917,544

METHOD OF TRANSFORMING 4-(α-HYDROXY-BENZAL) OXAZOLINE-5-ONE COMPOUNDS INTO N-ACYLATED AMINODIOLS

Gustavo A. Weitnauer, Naples, Italy, assignor to Lepetit, S.p.A., Milan, Italy

No Drawing. Application October 9, 1957
Serial No. 689,047

Claims priority, application Italy October 31, 1951

8 Claims. (Cl. 260—558)

The present invention relates to the manufacture of N-acylated aminodiols of the general formula

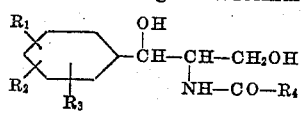

wherein $R_1$ and $R_2$ are the same or different, and represent hydrogen, halogen, preferably chlorine or bromine, lower alkyl or lower alkoxy radicals, such as methyl ethyl, propyl, amyl, methoxy, ethoxy, propoxy, and the like; $R_3$ is hydrogen or a nitro group; and $R_4$ is phenyl, or phenyl substituted by a lower alkyl, alkoxy or halogen (especially chlorine or bromine) or a lower alkyl or halogenated lower alkyl radical, e.g., p-methylphenyl, p-ethoxyphenyl, p-chlorophenyl, methyl, ethyl, isobutyl, and mono- and di-chloro, and mono- and di-bromomethyl, ethyl, propyl, and the like.

The present application is a continuation-in-part of my copending application, Serial No. 316,941, filed October 25, 1952, now abandoned.

The starting compounds for the process of the present invention are 4-(α-hydroxy-benzal)-oxazoline-5-one compounds of the formula

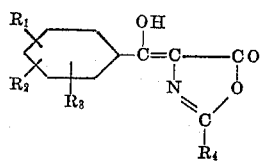

and their benzoyl isomers, wherein the group

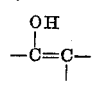

is replaced by

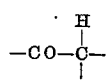

$R_1$, $R_2$, $R_3$, and $R_4$ being as above defined.

The N-acylated aminodiols include compounds which possess antibiotic activity, particularly chloramphenicol, and others which are valuable as intermediates for the preparation of compounds having such activity.

The oxazoline-5-one compounds employed as starting materials in my process may be obtained as described in my United States Patent No. 2,782,203, dated February 19, 1957, or in other ways. As described in such patent, the starting compounds of the present invention may be prepared by reacting a correspondingly substituted or unsubstituted benzoic acid anhydride or chloride with an N-acyl-glycine in the presence of an organic base at mild temperatures, treating the reaction mixture with water to decompose unreacted benzoic acid anhydride or chloride, and precipitating the reaction product with an acid.

The so-obtained substituted oxazoline-5-one derivatives may readily be converted, in accordance with the present invention, into N-acylated aminodiols of the above-mentioned formula by subjecting the starting compounds to a simultaneous splitting and reduction of the heterocyclic ring, as indicated in the following diagram:

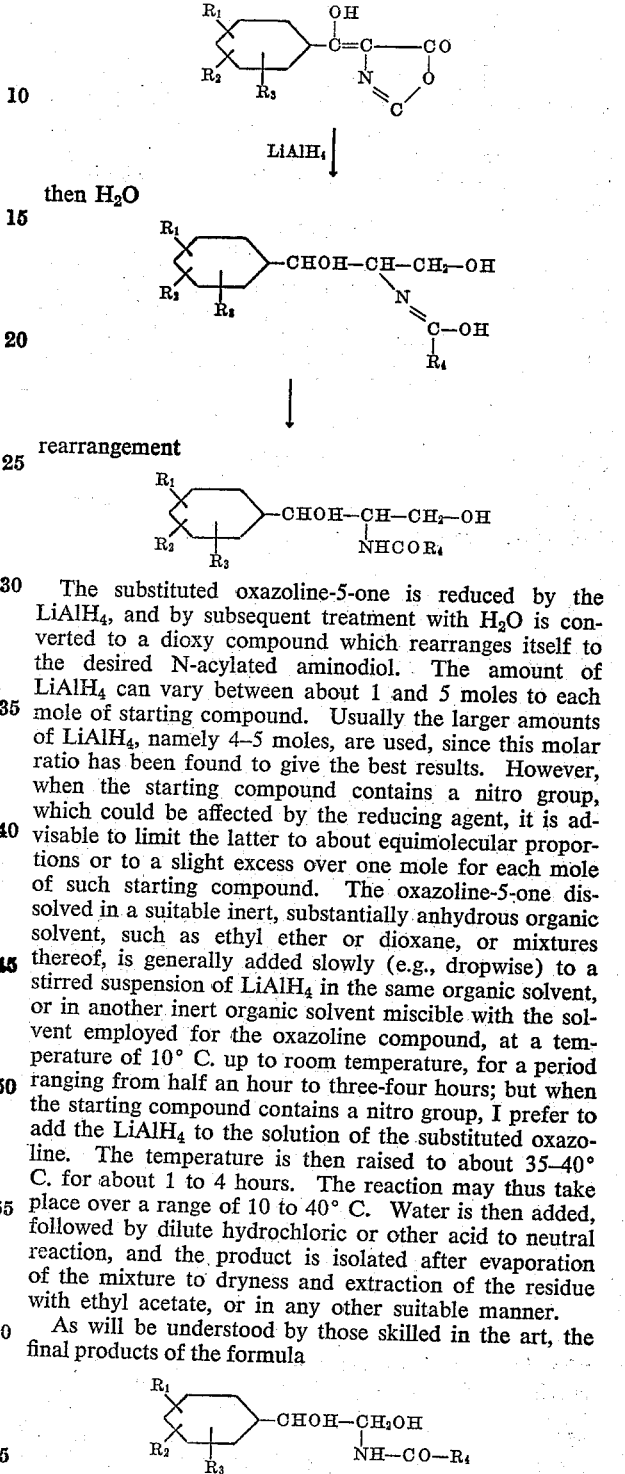

The substituted oxazoline-5-one is reduced by the LiAlH₄, and by subsequent treatment with H₂O is converted to a dioxy compound which rearranges itself to the desired N-acylated aminodiol. The amount of LiAlH₄ can vary between about 1 and 5 moles to each mole of starting compound. Usually the larger amounts of LiAlH₄, namely 4–5 moles, are used, since this molar ratio has been found to give the best results. However, when the starting compound contains a nitro group, which could be affected by the reducing agent, it is advisable to limit the latter to about equimolecular proportions or to a slight excess over one mole for each mole of such starting compound. The oxazoline-5-one dissolved in a suitable inert, substantially anhydrous organic solvent, such as ethyl ether or dioxane, or mixtures thereof, is generally added slowly (e.g., dropwise) to a stirred suspension of LiAlH₄ in the same organic solvent, or in another inert organic solvent miscible with the solvent employed for the oxazoline compound, at a temperature of 10° C. up to room temperature, for a period ranging from half an hour to three-four hours; but when the starting compound contains a nitro group, I prefer to add the LiAlH₄ to the solution of the substituted oxazoline. The temperature is then raised to about 35–40° C. for about 1 to 4 hours. The reaction may thus take place over a range of 10 to 40° C. Water is then added, followed by dilute hydrochloric or other acid to neutral reaction, and the product is isolated after evaporation of the mixture to dryness and extraction of the residue with ethyl acetate, or in any other suitable manner.

As will be understood by those skilled in the art, the final products of the formula are obtained as a mixture of the two diastereoisomeric racemates of the threo and erythro forms, which can be separated completely into the DL-threo and DL-erythro forms by known methods. The racemate of each structural form can then be separated in the usual manner into the optically active isomers.

Example 1

An ether solution of 1.4 g. of LiAlH₄ is added dropwise within an hour to a well-stirred solution of 10 g. of 2-dichloromethyl-4-(α-hydroxy-p-nitrobenzal) oxazoline-5-one in 40 ml. of anhydrous ether. The mixture is stirred for 2–2½ hours while maintaining boiling temperature (about 40° C.). Then it is cooled and an excess of H₂O is cautiously added. After that the mixture is neutralized with dilute hydrochloric acid and evaporated under reduced pressure. The residue is extracted with ethyl acetate, and after evaporating the solvent, 1-p-nitrophenyl-2-dichloroacetamido-1:3-propane-diol is obtained.

Example 2

To a stirred suspension of 5 g. of LiAlH₄ in 120 ml. of anhydrous ethyl ether, a solution composed of 8.2 g. of 2-phenyl-4-(α-hydroxybenzal) oxazoline-5-one in 60 ml. of anhydrous dioxane is dropped within an hour. The mixture is then heated to 35°–40° C. and this temperature is maintained for about 3 hours. After cooling, the excess of LiAlH₄ is cautiously destroyed with an excess of water. The suspension is neutralized with dilute hydrochloric acid and extracted several times with ethyl acetate. The extracts are combined, dried and evaporated to dryness, leaving behind the desired product which is 1-phenyl-2-benzoylamido-1:3-propane-diol.

Example 3

A suspension of 3.8 g. of LiAlH₄ in 35 ml. of anhydrous ethyl ether is vigorously stirred. A solution of 10 g. of 2 - methyl - 4 - [α - hydroxy - (3 - bromo - 4 - methoxy) benzal] oxazoline-5-one in 100 ml. of anhydrous dioxane is added dropwise to the suspension within one hour. While stirring, it is refluxed for 2–4 hours. Then it is cooled and the unreacted LiAlH₄ is cautiously destroyed with a small portion of water. The mixture is filtered and the filtrate is evaporated under reduced pressure nearly to dryness. The residual product is extracted with ethyl acetate, and after evaporating the latter, the desired compound, 1-(3-bromo-4-methoxyphenyl)-2-acetamido-1:3-propane-diol is obtained.

In similar fashion, by treating other starting compounds embraced by the substituted oxazoline formula presented above, such as 2-ethylidene-dibromo-4-(α-hydroxy - o - methyl - p - nitrobenzal)oxazoline - 5 - one and 2 - dichloromethyl - 4 - (α - hydroxybenzal)oxazoline-5-one, with lithium aluminum hydride, followed by addition of water, there are obtained the corresponding 1-phenyl-2-acylamido-1:3-propane-diols.

I claim:

1. In a method of transforming a 4-(α-hydroxy-benzal)-oxazoline-5-one compound of the formula

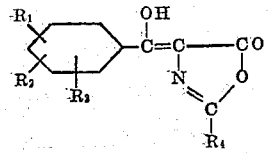

wherein R₁ and R₂ represent members of the group consisting of hydrogen, halogen, lower alkyl and lower alkoxy radicals, R₃ is a member of the group consisting of hydrogen and the nitro group, and R₄ is a member of the group consisting of phenyl, lower alkyl, and lower halogenated alkyl radicals, into an N-acylated amino-diol of the formula

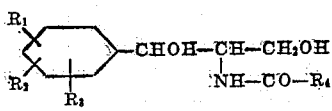

the steps which comprise reacting the oxazoline compound in a substantially anhydrous organic solvent medium with about 1.0 to 5 moles of lithium aluminum hydride at a temperature no higher than about 40° C., and then adding water to the reaction mixture.

2. Method according to claim 1, wherein the solvent medium is ethyl ether.

3. Method according to claim 1, wherein the starting material is a compound of the formula

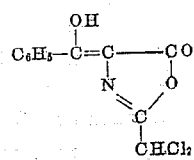

4. Method according to claim 1, wherein the starting material is a compound of the formula

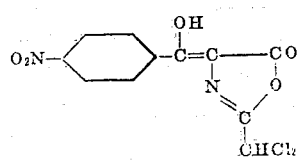

5. Method according to claim 1, wherein the starting material is a compound of the formula

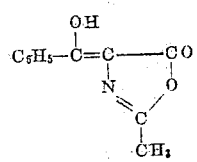

6. Method of transforming a 4-(α-hydroxy-benzal) oxazoline-5-one of the formula

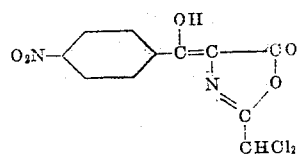

into 1 - p - nitrophenyl - 2 - dichloroacetamido - 1:3-propane-diol, which comprises boiling an anhydrous ether solution of the oxazoline compound with lithium aluminum hydride in the approximate proportion of 10 g. of the former to 1.4 g. of the latter, adding water to the reaction mixture, and neutralizing the mixture with dilute acid.

7. Method of transforming 2-phenyl-4-(α-hydroxybenzal)-oxazoline-5-one into 1-phenyl-2-benzoylamido-1:3-propane-diol which comprises heating 8.2 g. of the oxazoline compound in anhydrous dioxane with about 5 g. of lithium aluminum hydride at 35–40° C., cooling the mixture, decomposing excess hydride by adding an excess of water, and neutralizing the aqueous mixture with acid.

8. Method of transforming 2-methyl-4-[α-hydroxy-(3-bromo -4- methoxy) - benzal] - oxazoline - 5 - one into 1 - (3 - bromo - 4 - methoxyphenyl) - 2 - acetamido-1:3-propane-diol, which comprises slowly adding a dioxane solution of 10 g. of the oxazoline compound to a suspension of about 3.8 g. of lithium aluminum hydride in anhydrous ethyl ether, refluxing the mixture, cooling the same, and decomposing the excess hydride by the addition of water.

No references cited.